United States Patent
O'Donnell et al.

(10) Patent No.: US 8,266,667 B2
(45) Date of Patent: Sep. 11, 2012

(54) SYSTEMS AND METHODS FOR AWARDING AFFINITY POINTS BASED UPON REMOTE CONTROL USAGE

(75) Inventors: Frank O'Donnell, Las Vegas, NV (US); Brandt Thompson, Newport Coast, CA (US); Paul V. Darbee, Santa Ana, CA (US)

(73) Assignee: Logitech Europe S.A., Morges (CH)

( * ) Notice: Subject to any disclaimer, the term of this patent is extended or adjusted under 35 U.S.C. 154(b) by 145 days.

(21) Appl. No.: 12/387,631

(22) Filed: May 5, 2009

(65) Prior Publication Data

US 2010/0033638 A1 Feb. 11, 2010

Related U.S. Application Data

(63) Continuation of application No. 10/984,954, filed on Nov. 8, 2004, now abandoned, which is a continuation-in-part of application No. 09/080,315, filed on May 15, 1998, which is a continuation-in-part of application No. 08/999,716, filed on Oct. 6, 1997, which is a continuation of application No. 08/823,507, filed on Mar. 24, 1997.

(51) Int. Cl.
*H04N 7/173* (2011.01)
(52) U.S. Cl. ......... 725/133; 725/141; 725/153; 348/734
(58) Field of Classification Search .......... 725/9, 13–14, 725/32, 34, 42, 46–47; 348/734
See application file for complete search history.

(56) References Cited

U.S. PATENT DOCUMENTS

| | | | |
|---|---|---|---|
| 3,597,531 | A | 8/1971 | De Marinis et al. |
| 4,287,676 | A | 9/1981 | Weinhaus |
| 4,377,870 | A | 3/1983 | Anderson et al. |
| 4,392,022 | A | 7/1983 | Carlson |
| 4,475,123 | A | 10/1984 | Dumbauld et al. |
| 4,567,512 | A | 1/1986 | Abraham |
| 4,592,546 | A | 6/1986 | Fascenda et al. |
| 4,623,887 | A | 11/1986 | Welles, II |
| 4,703,359 | A | 10/1987 | Rumbolt et al. |
| 4,706,121 | A | 11/1987 | Young |
| 4,712,105 | A | 12/1987 | Kohler |

(Continued)

FOREIGN PATENT DOCUMENTS

DE 19520754 A1 12/1996

(Continued)

OTHER PUBLICATIONS

Extended European Search Report published Feb. 22, 2012 in Ep Publication No. 2 278 795, 3 pages.

*Primary Examiner* — Scott Beliveau
*Assistant Examiner* — Nicholas Corbo
(74) *Attorney, Agent, or Firm* — Kilpatrick Townsend & Stockton LLP

(57) ABSTRACT

Systems and methods for providing and promoting television programming, advertisements, and other content to selected viewers. A display is provided on a remote control device, prompts are provided on the display, and viewer responses to those prompts are monitored, stored in memory, and thereafter processed to reward viewers for responding properly to the prompts. Various methods for promoting such programs are also described.

12 Claims, 3 Drawing Sheets

U.S. PATENT DOCUMENTS

| | | | |
|---|---|---|---|
| 4,728,949 A | 3/1988 | Platte et al. |
| 4,746,919 A | 5/1988 | Reitmeier |
| 4,750,036 A | 6/1988 | Martinez |
| 4,774,511 A | 9/1988 | Rumbolt et al. |
| 4,792,972 A | 12/1988 | Cook, Jr. |
| 4,807,031 A | 2/1989 | Broughton et al. |
| 4,825,200 A | 4/1989 | Evans et al. |
| 4,845,491 A | 7/1989 | Fascenda et al. |
| 4,866,434 A | 9/1989 | Keenan |
| 4,876,592 A | 10/1989 | Von Kohorn |
| 4,888,709 A | 12/1989 | Revesz et al. |
| 4,899,370 A | 2/1990 | Kameo et al. |
| 4,918,439 A | 4/1990 | Wozniak et al. |
| 4,941,090 A | 7/1990 | McCarthy |
| 4,959,810 A | 9/1990 | Darbee et al. |
| RE33,369 E | 10/1990 | Hashimoto |
| 4,962,466 A | 10/1990 | Revesz et al. |
| 5,001,554 A | 3/1991 | Johnson et al. |
| 5,016,272 A | 5/1991 | Stubbs et al. |
| 5,033,079 A | 7/1991 | Catron et al. |
| 5,046,093 A | 9/1991 | Wachob |
| 5,065,235 A | 11/1991 | Iijima |
| 5,065,251 A | 11/1991 | Shuhart, Jr. et al. |
| 5,089,885 A | 2/1992 | Clark |
| 5,117,355 A | 5/1992 | McCarthy |
| 5,128,752 A | 7/1992 | Von Kohorn |
| 5,132,679 A | 7/1992 | Kubo et al. |
| 5,151,789 A | 9/1992 | Young |
| 5,202,826 A | 4/1993 | McCarthy |
| 5,204,768 A | 4/1993 | Tsakiris et al. |
| 5,206,722 A | 4/1993 | Kwan |
| 5,220,420 A | 6/1993 | Hoarty et al. |
| 5,237,327 A | 8/1993 | Saitoh et al. |
| 5,249,044 A | 9/1993 | Von Kohorn |
| 5,251,048 A | 10/1993 | Doane et al. |
| 5,255,313 A | 10/1993 | Darbee |
| 5,282,028 A | 1/1994 | Johnson et al. |
| 5,285,278 A | 2/1994 | Holman |
| 5,287,181 A | 2/1994 | Holman |
| 5,297,204 A | 3/1994 | Levine |
| 5,355,480 A | 10/1994 | Smith et al. |
| 5,367,316 A | 11/1994 | Ikezaki |
| 5,381,991 A | 1/1995 | Stocker |
| 5,382,947 A | 1/1995 | Thaler et al. |
| 5,396,546 A | 3/1995 | Remillard |
| 5,404,393 A | 4/1995 | Remillard |
| 5,406,558 A | 4/1995 | Rovira et al. |
| 5,410,326 A * | 4/1995 | Goldstein ............... 348/734 |
| 5,416,535 A | 5/1995 | Sato et al. |
| 5,446,551 A | 8/1995 | Kawaguchi et al. |
| 5,450,079 A | 9/1995 | Dunaway |
| 5,455,570 A | 10/1995 | Cook et al. |
| 5,461,667 A | 10/1995 | Remillard |
| 5,479,268 A | 12/1995 | Young et al. |
| 5,483,276 A | 1/1996 | Brooks et al. |
| 5,497,185 A | 3/1996 | Dufresne et al. |
| 5,500,681 A | 3/1996 | Jones |
| 5,500,691 A | 3/1996 | Martin et al. |
| 5,502,504 A | 3/1996 | Marshall et al. |
| 5,504,475 A | 4/1996 | Houdou et al. |
| 5,510,828 A | 4/1996 | Lutterbach et al. |
| 5,515,106 A | 5/1996 | Chaney et al. |
| 5,515,270 A | 5/1996 | Weinblatt |
| 5,515,490 A | 5/1996 | Buchanan et al. |
| 5,517,254 A | 5/1996 | Monta et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,528,304 A | 6/1996 | Cherrick et al. |
| 5,532,689 A | 7/1996 | Bueno |
| 5,532,732 A | 7/1996 | Yuen et al. |
| 5,537,106 A | 7/1996 | Mitsuhashi |
| 5,537,107 A | 7/1996 | Funado |
| 5,537,463 A | 7/1996 | Escobosa et al. |
| 5,539,393 A | 7/1996 | Barfod |
| 5,545,857 A | 8/1996 | Lee et al. |
| 5,552,837 A | 9/1996 | Mankovitz |
| 5,557,338 A | 9/1996 | Maze et al. |
| 5,557,721 A | 9/1996 | Fite et al. |
| 5,559,548 A | 9/1996 | Davis et al. |
| 5,566,353 A | 10/1996 | Cho et al. |
| 5,568,367 A | 10/1996 | Park |
| 5,576,755 A | 11/1996 | Davis et al. |
| 5,576,768 A | 11/1996 | Gomikawa |
| 5,579,055 A | 11/1996 | Hamilton et al. |
| 5,583,491 A | 12/1996 | Kim |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,596,373 A | 1/1997 | White et al. |
| 5,600,364 A | 2/1997 | Hendricks et al. |
| 5,600,573 A | 2/1997 | Hendricks et al. |
| 5,603,078 A | 2/1997 | Henderson et al. |
| 5,604,923 A | 2/1997 | Wilkus |
| 5,619,196 A | 4/1997 | Escobosa |
| 5,625,608 A | 4/1997 | Grewe et al. |
| 5,629,733 A | 5/1997 | Youman et al. |
| 5,638,113 A | 6/1997 | Lappington et al. |
| 5,646,608 A | 7/1997 | Shintani |
| 5,650,831 A | 7/1997 | Farwell |
| 5,657,005 A | 8/1997 | Seebeck et al. |
| 5,659,653 A | 8/1997 | Diehl et al. |
| 5,663,757 A | 9/1997 | Morales |
| 5,684,526 A | 11/1997 | Yoshinobu |
| 5,689,353 A | 11/1997 | Darbee et al. |
| 5,710,605 A | 1/1998 | Nelson |
| 5,734,838 A | 3/1998 | Robinson et al. |
| 5,734,853 A | 3/1998 | Hendricks et al. |
| 5,737,028 A | 4/1998 | Bertram et al. |
| 5,761,601 A | 6/1998 | Nemirofsky |
| 5,768,680 A | 6/1998 | Thomas |
| 5,774,172 A | 6/1998 | Kapell |
| 5,781,894 A | 7/1998 | Petrecca et al. |
| 5,794,210 A | 8/1998 | Goldhaber et al. |
| 5,806,065 A | 9/1998 | Lomet |
| 5,819,034 A | 10/1998 | Joseph et al. |
| 5,822,123 A | 10/1998 | Davis et al. |
| 5,828,945 A | 10/1998 | Klosterman |
| 5,850,249 A | 12/1998 | Massetti et al. |
| 5,850,340 A | 12/1998 | York |
| 5,855,008 A | 12/1998 | Goldhaber et al. |
| RE36,116 E | 2/1999 | McCarthy |
| 5,870,030 A | 2/1999 | DeLuca et al. |
| 5,870,155 A | 2/1999 | Erlin |
| 5,870,683 A | 2/1999 | Wells et al. |
| 5,883,680 A | 3/1999 | Nykerk |
| 5,886,691 A | 3/1999 | Furuya et al. |
| 5,907,322 A | 5/1999 | Kelly et al. |
| 5,923,016 A | 7/1999 | Fredregill et al. |
| 5,940,073 A | 8/1999 | Klosterman et al. |
| 5,946,646 A | 8/1999 | Schena et al. |
| 6,002,443 A | 12/1999 | Iggulden |
| 6,002,450 A | 12/1999 | Darbee et al. |
| 6,040,829 A | 3/2000 | Croy et al. |
| 6,057,872 A * | 5/2000 | Candelore .................. 725/23 |
| 6,122,011 A * | 9/2000 | Dias et al. .................. 348/569 |
| 6,130,726 A | 10/2000 | Darbee et al. |
| 6,144,375 A | 11/2000 | Jain et al. |
| 6,369,821 B2 | 4/2002 | Merrill et al. |
| 6,504,580 B1 | 1/2003 | Thompson et al. |
| 6,567,116 B1 | 5/2003 | Aman et al. |
| 6,704,929 B1 * | 3/2004 | Ozer et al. .................. 725/13 |
| 2002/0184626 A1 | 12/2002 | Darbee et al. |
| 2005/0097594 A1 | 5/2005 | O'Donnell et al. |

FOREIGN PATENT DOCUMENTS

| | | |
|---|---|---|
| EP | 0972280 A1 | 1/2000 |
| EP | 0995313 A1 | 4/2000 |
| FR | 2738931 A1 | 3/1997 |
| GB | 2304217 A | 3/1997 |
| WO | WO 93/12612 | 6/1993 |
| WO | WO 93/19427 | 9/1993 |
| WO | WO 94/15417 | 7/1994 |
| WO | WO 95/01056 | 1/1995 |
| WO | WO 95/01057 | 1/1995 |

| | | |
|---|---|---|
| WO | WO 95/01058 | 1/1995 |
| WO | WO 95/01059 | 1/1995 |
| WO | WO 95/32563 | 11/1995 |
| WO | WO 95/32583 | 11/1995 |
| WO | WO 96/28903 A1 | 9/1996 |
| WO | WO 96/30864 | 10/1996 |
| WO | WO 97/23960 | 7/1997 |
| WO | WO 97/33434 A | 9/1997 |
| WO | WO 97/47135 A1 | 12/1997 |
| WO | WO 98/16062 A | 4/1998 |
| WO | WO 98/44477 A1 | 10/1998 |

* cited by examiner

| 7:03 | ◄ 7:00 AM ► | |
|---|---|---|
| KCBS | ET | |
| 04 | SEINFELD | *W |
| KKTV | NEWS | |

| SENDING CHANNEL |
|---|
| 14 CNN |
| HEADLINE NEWS |
| WATCH & WIN |

SYSTEMS AND METHODS FOR AWARDING AFFINITY POINTS BASED UPON REMOTE CONTROL USAGE

This application is a continuation of Ser. No. 10/984,954, filed Nov. 8, 2004, now abandoned which is a continuation-in-part of copending application Ser. No. 09/080,315, filed on May 15, 1998, which is a continuation-in-part of application Ser. No. 08/999,716, filed on Oct. 6, 1997, which is a continuation of application Ser. No. 08/823,507 filed on Mar. 24, 1997. The disclosures of each of the above-listed applications are incorporated fully herein by reference.

FIELD OF THE INVENTION

The present invention relates generally to television systems and the Internet and, more particularly, to systems and methods for effectively promoting television programming, for developing viewership loyalty within selected demographic groups, and for selectively delivering advertising, promotional, and other content to television viewers desiring such content.

BACKGROUND OF THE INVENTION

Recently, substantial attention has been directed to the field of digital cable television systems, the Internet, and to methods of promoting and utilizing various types of advertising and programming content provided on such systems.

For example, U.S. Pat. No. 5,855,008, issued to Goldhaber et al. on Dec. 29, 1998, describes an approach for distributing advertising and other information over a computer network, such as the Internet. The Goldhaber, et al. '008 patent defines "attention brokerage" as the business of buying and selling the "attention" of consumers, and states that attention brokerage can be used to provide direct, immediate payment to a consumer for paying attention to an advertisement or other information. The patent further states that the compensation may be used directly or indirectly to compensate the owners of content or may be used for other purposes, and that a link between an advertisement and a selected viewer group may be provided by reference to a database of digitally-stored demographic profiles of potential users. The Goldhaber, et al. '008 patent also states that certain advertisements may be viewed as "negatively priced" information because consumers are paid for their attention to the information, and that a special icon or other symbol displayed on a computer screen may represent compensation and allow users to choose whether they will view an ad or other information and receive the associated compensation.

U.S. Pat. No. 5,794,210, issued to Goldhaber, et al. on Aug. 11, 1998, also is directed to various categories of attention brokerage using the internet.

Like the Goldhaber, et al. patents, U.S. Pat. No. 5,781,894, issued to Petrecca, et al. on Jul. 14, 1998, describes various systems and methods for advertising on personal computers. The described system allows a user to choose to activate an advertising system in return for receiving some type of compensation.

Turning now more toward the realm of television advertising, U.S. Pat. No. 5,532,732, issued to Yuen, et al. on Jul. 2, 1996, describes an apparatus and method for using compressed codes to monitor television program viewing. The patent describes how an audience monitoring system may determine whether a television is turned on, and how the system may monitor channel selections and the times at which the selections were made. Data descriptive of the channel selections and the times of those selections is then downloaded, for example over a telephone line, to a central database.

U.S. Pat. No. 5,907,322, issued to Kelly et al. on May 25, 1999, describes a television event marking system. The described system stores one or more broadcast event-identifiers within an activity table and, thereafter, processes the stored event-identifier data with a database of TV schedules, events, and company information to identify one or more Internet websites that may be of interest to a viewer. Hotlinks to those website addresses are then provided to the viewer via the system or a personal computer.

U.S. Pat. No. 5,500,681, issued to Jones on Mar. 19, 1996, describes an apparatus and method for generating product coupons in response to televised offers. As described in the Jones '681 patent, coupon information is stored in a memory at a cable television station, and the cable television station transmits multiple video signals, each representing a different source of television programming, over multiple television channels on a cable network. A video signal may, at times, such as during a product advertisement or other offer, include an embedded coupon identifier. A coupon subsystem at the cable television station monitors each video signal and retrieves token information from a database when it detects a corresponding embedded token identifier. The coupon information is transmitted over a data channel on the cable network, and a subscriber unit at the television viewer's site receives the data channel and extracts the coupon information. The television programming audibly or visually alerts the viewer that the coupon may be generated, and if the viewer actuates an input device, such as a button on a television remote control unit, a printer generates a coupon bearing the coupon information.

U.S. Pat. No. 5,287,181, issued to Holman on Feb. 15, 1994, describes an electronic coupon generating system. Within the system, a decoder includes a display driver for displaying indicia on a television monitor screen responsive to coupon-related data that is encoded in a television signal transmission. Upon observing the indicia on the television monitor screen, the user can manually and selectively extract coupon-related data from the television signal transmission. The extracted coupon-related data may be stored on a recording medium such as a magnetically striped card or, alternatively, may be used to generate a coupon at the location of the television viewer.

U.S. Pat. No. 5,128,752, issued to Von Kohorn on Jul. 7, 1992, is directed to systems and methods for generating coupons or tokens within the home of a television viewer. The described system includes broadcastings at a central location for transmitting electronic program signals that have product information and token redemption information embedded therein. Token generating units are provided at various member locations and provide users with the ability to generate coupons or tokens at those locations.

While the foregoing patents describe numerous methodologies for providing advertising and/or coupon information to selected individuals or demographic groups via a cable television network or the Internet, the described systems suffer from several disadvantages. First, many of the systems require that current programming content provided to a viewer on a television screen or computer monitor be interrupted while advertising or other promotional content is provided on the screen or monitor. This, tends to irritate television viewers and computer users and, therefore, reduces the effectiveness of any advertising or promotional content that has been provided. Similarly, the systems described above do not allow for advertising or promotional content to be selectively delivered to a viewer in a manner that is responsive in real time to viewer channel or content selections. Nor do the systems described above allow for the effective promotion of television viewership affinity awards programs or "watch-and-win" programs.

SUMMARY OF THE INVENTION

In one particularly innovative aspect, the present invention is directed to improved systems and methods for providing advertising and promotional content to television viewers and, in particular, to various systems and methods for implementing simultaneously within a cable system or other broadcast network a plurality of affinity awards programs or watch-and-win programs, each associated with a particular television channel, program, or timeslot.

For example, in accordance with one embodiment of the present invention, a display is provided on a remote control device, and advertising and promotional content is selectively provided on the display based, at least in part, upon a current channel or television program that a user of the remote control device has selected and is viewing. Thus, it is possible in accordance with the present invention to selectively provide advertising and promotional content to a television viewer in real time and in response to channel selections that the user has made. This allows for "affinity awards" programs to be associated with a specific television channel, program, or timeslot within a twenty-four (24) our period, and allows for multiple affinity awards programs to be run on the remote control device at any given time. Such programs may take many forms, but a "watch and win" format is presently preferred. In such a format, a viewer will be rewarded for interacting with the remote control device in a predetermined manner. For example, following the provision of a prompt on the display of the remote control device, inputs to the remote control device may be monitored, and data corresponding to those inputs and associated times of entry may be stored within a memory for contemporaneous or later processing by a content provider, such that the user of the remote control device may be rewarded for selecting a channel at a specific time or within a selected period of time, or alternatively, may be rewarded for not changing a channel within the selected period.

In alternative embodiments, questions about current programming or advertisements may be provided on the screen of the remote control device, and a viewer may be rewarded for providing proper responses to the questions. The viewer, if he or she so desires, also may be provided via the screen on the remote control device with additional information about television advertisements or other content. Or, the viewer may "bookmark" an advertisement and thereby provide an indication to a content provider that the viewer would be interested in receiving additional information about a product contained, for example, in an advertisement or, alternatively, would be interested in receiving a sample of such a product.

In another innovative aspect, the present invention is directed to various systems and methods for promoting affinity awards programs using a remote control unit or an associated program guide. In one presently preferred form, a program guide is provided on a display device, and visual indicators are provided within the program guide to identify those television channels, programs, networks, or timeslots that are affiliated with a selected affinity awards program or watch-and-win game. The display device preferably is provided on a remote control device, but also may comprise a television set or monitor that is associated with the remote control device.

In alternative embodiments, the visual indicators may be included within, for example, banners incorporated in program marquees. Marquees are provided on screens, for example, when digital cable systems effect a channel change. As the content for the newly selected channel is decompressed, a marquee indicating the channel selected, associated network, and currently running program is generally provided on the television screen. In accordance with the present invention, an affinity awards or watch-and-win banner may be provided within a marquee provided on a television screen or, more preferably, on the display of a remote control device. In alternative embodiments, a tone or other audio or visual indicator may accompany the affinity awards or watch-and-win banner within a marquee.

Other objects and features of the present invention will become apparent from consideration of the following description taken in conjunction with the accompanying drawings.

DETAILED DESCRIPTION OF PREFERRED EMBODIMENTS

Figure 1:
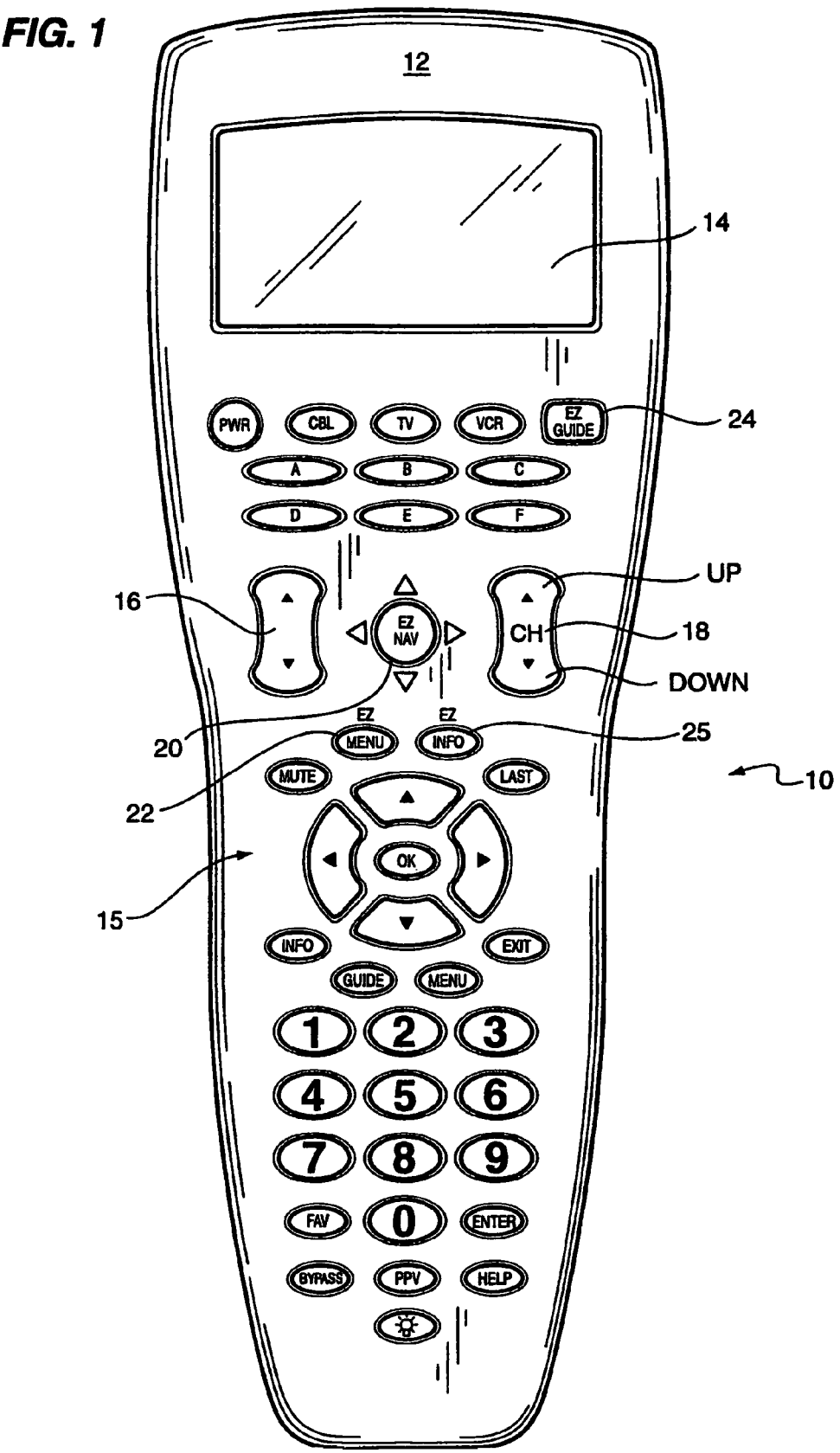
FIG. 1 is an illustration of a remote control device in accordance with a preferred form of the present invention.

Turning now to the drawings, FIG. 1 provides an illustration of a remote control device 12 in accordance with a preferred form of the present invention. The structure and operation of the remote control device 12 is described in detail in copending application Ser. No. 09/080,315, entitled "Program Guide on a Remote Control Display," which is incorporated fully herein by reference.

Figure 2:
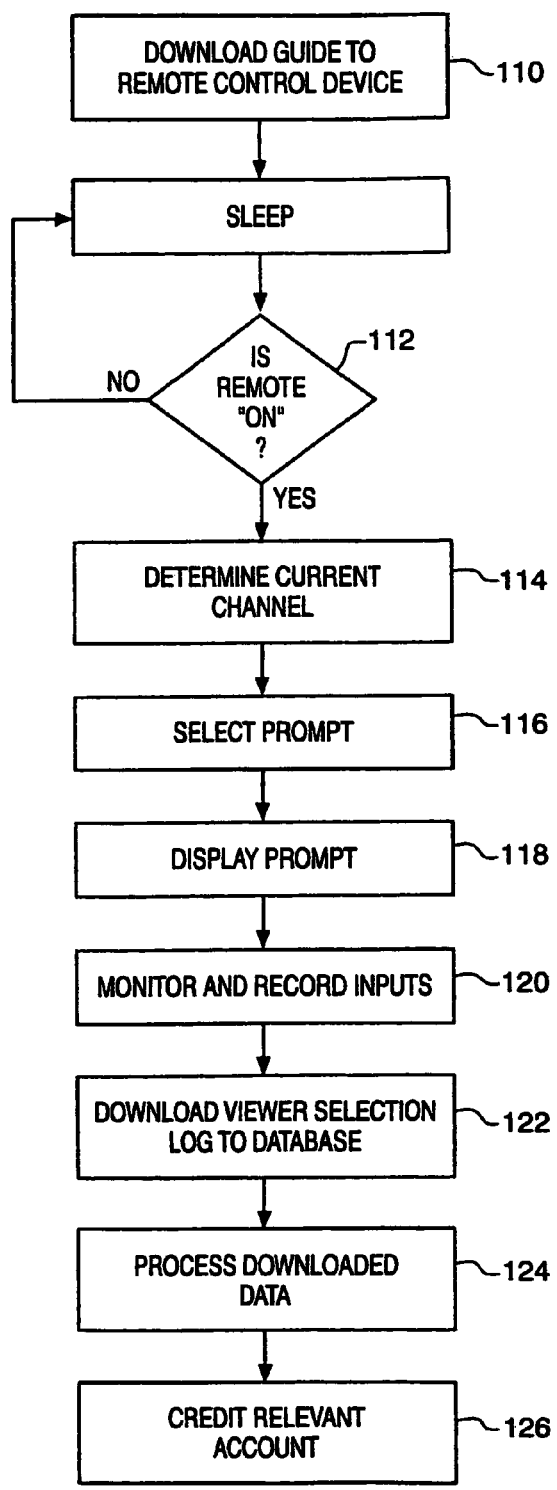
FIG. 2 is a flow chart illustrating a basic programming sequence used within an affinity awards program in accordance with a preferred form of the present invention.

Turning now also to FIG. 2, an affinity awards or watch-and-win program in accordance with the present invention may be implemented using the remote control device 12 shown in FIG. 1. To implement such a program, a television viewing guide, associated channel map, and one or more promotional or advertising content data files are downloaded to a memory (not shown) provided within the remote control device 12 (step 110). The remote control device will then generally remain dormant (e.g., in a sleep state) until a television viewer picks up the remote control device 12 and enters via a key pad 15 an instruction causing the remote control device 12 to wake up and turn "on" an associated television set (not shown) and, for example, an associated cable television or satellite television tuner or descrambler box (also not shown). Upon detecting that the television set and cable or satellite TV box have been turned "on" (step 112), the remote control device 12 will determine the current channel that is being watched by the viewer (step 114). This may be done, for example, by incorporating a channel selection instruction within the cable box turn "on" procedure or, alternatively, by retrieving from memory data indicating the last channel that was selected before the cable box (not shown) and television set (not shown) were turned "off." Once the current channel has been determined, data from the channel map within the program guide may be used to select an advertisement, watch-and-win prompt, or other content for depiction on the display 14 of the remote control device 12 (step 116), and the advertisement, prompt, or other content may be depicted on the display 14 (step 118).

In the event that a prompt is provided on the display 14, the remote control device 12 then will monitor user inputs entered via the key pad 15 to determine whether the viewer follows the instructions provided in the prompt (step 120). The viewer may be prompted, for example, to select a channel at a predetermined time, or within a predetermined period of time, or alternatively, may be prompted to remain on the current channel (i.e., do nothing) for a predetermined period of time. To determine whether the viewer has followed the instructions provided in the prompt, the remote control device 12 will monitor and store any entries made by the viewer along with data corresponding to the times that the entries were made. The viewer response data then may be downloaded via the cable system, or another network, to a central database (step 122). The data stored in the database may then be processed, and the viewer's channel selection or other activity, or inactivity, may be verified (step 124). Finally, if the prompt was related to an affinity awards program or to a watch-and-win game, the viewer's account for that program or game may be credited in a proper manner, for example, by awarding points to the account. (step 126).

Those skilled in the art will appreciate that the methodology described above requires the following basic steps: using a screen on a remote control device, prompting a viewer to take an action (or to refrain from taking an action); verifying that the action has been taken; and providing the viewer with a reward for taking the action. Those skilled in the art will further appreciate that numerous variations of this innovative methodology may be implemented using a remote control device of the type described herein. For example, in alternative forms, a viewer may be prompted to answer one or more questions about a selected television program, advertisement, or other content, that is provided either on the display 14 of the remote control device 12 or on an associated television set (not shown), and the user may be rewarded for providing the response. The response may take the form of an evaluation or rating of the program, advertisement, or content that has been provided to the viewer, or the response might require the use, analysis, or memory of information provided in the program, advertisement, or other content. As an example, the viewer may be prompted to enter a numeric value corresponding to a level of satisfaction with a current television program or advertisement, or the user may be prompted to cast a vote for or against legislative measure discussed on the news. Thus, the systems and methods of the present invention allow for broadcasters, advertisers, and the like to obtain tremendous amounts of feedback from the viewing public without interrupting current programming, and further allow for advertisements to be tailored to specific groups of viewers based upon numerous variables including, for example, currently playing programs or advertisements, various types of demographic data, and responses to prior prompts or participation in prior watch-and-win-games.

Those skilled in the art will appreciate that, in another innovative aspect, the present invention allows for multiple affinity awards programs, watch-and-win programs, or other advertising or promotional programs to be run on the remote control device 12 at any given time. This capability is enabled by providing a clock and a program guide memory storage facility within each remote control device 12. Moreover, the use of a clock and stored program guide allows for various affinity awards and watch-and-win programs, or other content, to be associated with a particular channel, network, or timeslot, and therefore, allows for different programs, etc., to be associated with different channels and/or timeslots. This will allow for watch-and-win programs associated with different channels and common timeslots to compete with one another, because the content to be provided on the display of the remote control device may be selected based, in part, upon the channel currently selected and the current time of day.

In other innovative embodiments, a television viewer may "bookmark" a television program, advertisement, or other content that is provided on the screen 14 of the remote control device 12 or, alternatively, on the screen of an associated television set. To bookmark an advertisement, the viewer might depress the "Info" key or a designated "bookmark" key provided on the remote control device 14 and, thereby, cause to be stored within the memory (not shown) of the remote control device 12 an indication that the viewer would be interested in receiving additional information about a product or service shown in an advertisement or, alternatively, that the viewer would be interested in receiving a sample of the product described or a coupon relating to the product described. The stored data may then be downloaded to a central database (not shown) in, for example, the form of a recorded viewing log, and the downloaded information may be processed to ensure that the viewer is provided with the requested information, samples, or product.

Alternatively, a "bookmarking" feature in accordance with the present invention may provide a user with additional information about an advertisement or program in real time. For example, where an advertisement is provided on the screen 14 of the remote control device 12, the advertisement may comprise several portions that are stored within the memory of the remote control device 12 and may be selectively accessed depending upon the interest of the viewer. An interested viewer could, therefore, "drill down" through a series of advertisements at his or her discretion depending upon the content provided. Alternatively, the remote control unit 12 could be configured to upload additional advertising information from an associated tap antenna (not shown), cable television box, or serial link to a personal computer or telephone, upon the entry of such a request by the television viewer.

Figures 3, 4:
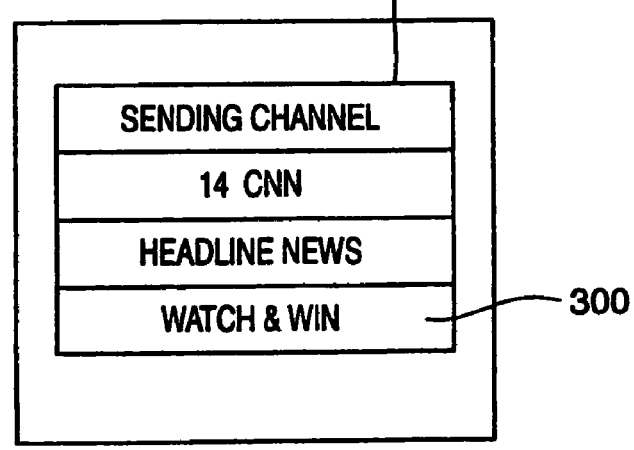
FIG. 3 is an illustration of a screen of a program guide including an indicator denoting an affiliation of a program with an affinity awards program or watch-and-win program in accordance with the present invention.
FIG. 4 is an illustration of a marquee that may be provided on a display of a remote control device or associated television set in accordance with the present invention.

Turning now also to FIG. 3, in another innovative aspect, the present invention is directed to various methods for promoting viewer affinity awards and watch-and-win programs. In such embodiments, an icon, symbol, or other indicator 200 may be provided within a screen of a program guide 210 adjacent television program listings, channels, or network call letters to designate that an affinity awards program or watch-and-win program is associated with a particular television show, timeslot or network. An exemplary program guide screen 210 incorporating a watch-and-win indicator 200 is shown in FIG. 3. In one particularly innovative aspect, an award indicator 200 provided within a guide 210 provided on the display 14 of the remote control device 12 may be associated with an embedded or underlying program description downloaded to the remote control device 12, such that the viewer may obtain additional information about the program via the display 14.

Similarly, in alternative embodiments shown, for example, in FIG. 4, the logo, symbol, or indicator 300 denoting an affiliation with an affinity awards program or watch-and-win program may be provided within a marquee 310 that is provided on the display 14 of the remote control device 12 when a particular channel is selected. As shown in FIG. 4, the marquee 310 may include a channel indication, the network call letters associated with the channel, the title of the content running on the channel, and a watch-and-win indicator 300. The marquee also may be provided on the screen of an associated television set when, for example, a digital cable television box switches from one channel to another.

Finally, in still another innovative aspect, the present invention is directed to the use of "forced" or "direct" tuning methodologies within television advertising or program distribution systems. Direct tuning involves transmitting specific channel select signals to a broadcast, cable or satellite television tuning box in response to all channel select inputs that may be entered into a remote control device by a user. For example, if a cable television tuning box is set to channel 4, and the user of a remote control unit employing a direct tuning protocol pushes the channel up button on the remote control device, the remote control device will transmit a signal denoting "select channel 5" to the cable television tuning box rather than transmitting a "channel up" signal. This allows for a channel selection log to be readily compiled in response to viewer channel selection activity and, importantly, allows affinity awards programs and watch-and-win programs in accordance with the present invention to accurately monitor viewer input sequences to determine whether or not a selected viewer follows instructions provided within a given prompt or advertising message.

Preferably, the direct tuning capability is achieved through the use of a program guide, an associated channel map, and a programming signal database, often referred to in the art as an "R-byte" file or "IR command table," that are downloaded to the remote control device 12. The program guide and channel map function to show a viewer what programs are available on selected channels within predetermined timeslots, and the programming signal database provides a link between the listed channels and the signals that are used for their selection. For example, depending upon the system used, channel "4" corresponding to NBC may be selected by transmitting a "4" signal, a "04" signal, a "04 enter" signal, or an "enter 04" signal to an associated cable TV box. Timing of the transmissions also may vary depending upon the configuration of the receiver or tuner with which the remote control device 12 operates. It may be noted that, where a remote control device 12 does not include a display 14, direct tuning may be effected using only a channel map and a programming signal database.

Preferably, a plurality of channel maps and programming signal databases may be downloaded to or stored within the memory of each remote control device 12, as the use of multiple databases allows a single remote control device 12 to work with any of a number of cable, satellite, or other signal distribution systems, so long as the remote control device 12 is properly configured at set-up. This also allow, for example, cable broadcast networks to reassign channels without effecting hardware replacements, as any necessary changes may be reflected in the program guide and channel map for the relevant area.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A method for selecting advertising content associated with television programming, said method comprising the steps of:
   receiving by a portable device a user input for a channel up or channel down command for viewing on an associated television set;
   determining a new channel selection based on the user input for the channel up or channel down command, a channel map stored on the portable device, and an indication of a currently selected channel stored on the portable device;
   storing the new channel selection within said portable device;
   sending a command to the television set including a channel indicator for the new channel selection;
   using said stored new channel selection to select an advertisement for depiction on a display provided on said portable device; and
   displaying the selected ad on the display.

2. A portable device comprising:
   a display;
   a transmitter and receiver circuitry for transmitting signals to an associated television monitor and receiving signals from a program guide data transmission source;
   a microprocessor;
   an interface for receiving a user input for a channel up or channel down command for the television monitor; and
   a memory,
   said microprocessor controlling said display and said transmitter and receiver circuitry, and
   said memory having stored therein a program that, when executed by said microprocessor, allows for determining a new channel selection based on the user input for the channel up or channel down command, a channel map stored on the portable device, and an indication of a currently selected channel stored on the portable device;
   sending a command for the television monitor including a channel indicator for the new channel selection; and
   advertising and promotional content to be selected for depiction on said display based upon a predetermined relationship between said advertising and promotional content and the new channel selection.

3. The apparatus of claim 2, wherein said advertising and promotional content comprises an advertisement promoting television content on a channel other than a channel corresponding to said channel indicator.

4. The apparatus of claim 2, wherein said advertising and promotional content comprises one or more questions corresponding to television content on a channel corresponding to said channel indicator.

5. The apparatus of claim 2, wherein said advertising and promotional content comprises an offer of an award for selecting at a predetermined time a channel other than a channel corresponding to said channel indicator.

6. The apparatus of claim 2, wherein said advertising and promotional content comprises an offer of an award for selecting at a predetermined time a channel corresponding to said channel indicator.

7. The method of claim 1, wherein the stored channel indication is associated with a program.

8. The method of claim 1, wherein the stored channel indication is associated with a program played at a specific time.

9. The method of claim 8, wherein the program is a television program.

10. The method of claim 1, wherein the portable device is a remote control device.

11. The method of claim 2, wherein the channel indicator is associated with a select program at a select time.

12. The method of claim 2, wherein the portable device is a remote control device.

* * * * *